United States Patent [19]

Young

[11] 4,001,649
[45] Jan. 4, 1977

[54] TEMPERATURE MONITORING OF SEMICONDUCTORS

[75] Inventor: John A. I. Young, Peterborough, Canada

[73] Assignee: Canadian General Electric Company, Toronto, Canada

[22] Filed: Dec. 30, 1975

[21] Appl. No.: 645,323

[30] Foreign Application Priority Data

Dec. 3, 1975 Canada .................... 241111

[52] U.S. Cl. .................... 317/41; 73/342; 73/362 SC; 307/202 R; 317/27 R; 323/68; 323/69; 340/228 R

[51] Int. Cl.² .................... H02H 5/04; H02H 7/14

[58] Field of Search .................... 317/41, 40 R, 27 R, 317/33 SC, 132; 323/68, 69; 324/105, 106; 321/12; 219/501; 340/228 R; 73/342, 362 SC, 362 AR; 307/252 R, 252 B, 310, 202 R

[56] References Cited

UNITED STATES PATENTS

| | | | |
|---|---|---|---|
| 3,564,293 | 2/1971 | Mungenast | 317/41 X |
| 3,622,849 | 11/1971 | Kelly, Jr. et al. | 317/33 SC |
| 3,868,554 | 2/1975 | Konrad | 323/68 X |
| 3,961,173 | 6/1976 | Perry et al. | 317/40 R X |

FOREIGN PATENTS OR APPLICATIONS

287,362   1971   U.S.S.R. .................... 73/362 SC

Primary Examiner—J D Miller
Assistant Examiner—Patrick R. Salce
Attorney, Agent, or Firm—Arnold E. Renner; Philip L. Schlamp

[57] ABSTRACT

A current sensor provides a voltage signal which is proportional to the average current flowing through a semiconductor device junction. This voltage signal is applied to a first analogue circuit which produces an output voltage indicative of the average power dissipated at the junction. The output of the first analogue circuit is applied to a second analogue circuit which outputs a voltage signal indicative of the temperature difference between the junction and a heat sink associated with the semiconductor device and to a third analogue circuit which outputs a voltage signal indicative of the temperature difference between the heat sink and ambient. The ambient temperature is sensed by an ambient temperature sensor which outputs a voltage signal indicative of the ambient temperature. A voltage summing circuit sums the output voltages from the second and third analogue circuits and from the ambient temperature sensor, and produces an output voltage indicative of the junction temperature.

14 Claims, 3 Drawing Figures

TEMPERATURE MONITORING OF SEMICONDUCTORS

BACKGROUND OF THE INVENTION

The present invention relates generally to the monitoring of the temperature of semiconductor devices, and more particularly to a method and circuit for monitoring the junction temperature of semiconductor devices.

Solid state devices such as diodes and thyristors are now well known in electric power applications. It is also well known that much of the heat generated in a power semiconductor device originates at its current carrying junction or junctions. As a result, the junction attains the highest temperature in the semiconductor device, and is the point at which semiconductor failure usually occurs, should the temperature become excessive. The term "junction" is used in this specification in its broadest sense. Semiconductor devices vary in the number of individual junctions that conduct current from anode to cathode. For example, a diode may have a single junction while a thyristor normally has a number of junctions. In the description and claims to follow, the use of the expression junction is intended to embrace both single and multiple junctions in semiconductors devices.

The determination of junction temperature cannot be accomplished with a satisfactory degree of accuracy by measuring the temperature of the structure employed to remove heat from the semiconductor device. Owing to the slow thermal transfer characteristics of these structures, external temperature measurements do not accurately reflect junction temperature. In applications of power semiconductor devices, it is impractical to measure junction temperature directly; as a result, the protective devices used have taken an indirect approach. The oldest and best known of such protective devices is probably the fuse, the particular fuse used being designed to blow at a current value considered safe for the semiconductor. This is a somewhat "rough and ready" approach, an approach which tends to not utilize the full current carrying capabilities of the semiconductor and one which is not usually fast enough to protect the semiconductor against all transient conditions. Moreover, fuses introduce the problem of matching the thermal characteristics of the fuse with those of the semiconductor.

Solid state electronic circuits are also known for protecting power semiconductors against overtemperatures. As would be expected, these circuits can be made more sensitive and faster acting than fuses. Circuits of this type can be found in U.S. Pat. No. 3,622,849, "Thyristor Junction Temperature Monitor" issued Nov. 23, 1971 to F. W. Kelley and F. L. Steen and in U.S. patent application, Ser. No. 635,141, "Temperature Monitoring Of Semiconductors" by David R. Boothman and Everett C. Elgar, filed Nov. 25, 1975.

SUMMARY OF THE INVENTION

It is, therefore, an object of the present invention to provide an improved circuit and method for the monitoring of semiconductor junction temperatures.

It is a further object to provide an improved circuit and method for the monitoring of semiconductor junction temperatures to provide an output which may be used for information purposes or for providing a corrective action as desired.

It is another object to provide an improved method and circuit for monitoring the junction temperature of a semiconductor which is easily implemented and which does not rely upon the sensing of heat sink temperatures.

The foregoing and other objects are achieved, in accordance with the present invention, by producing a signal which is proportional to the power dissipated at the semiconductor junction. This signal is then utilized to produce second and third signals proportional, respectively, to the temperature difference between the junction and a heat sink associated with the device and the temperature difference between the heat sink and ambient. A fourth signal, proportional to the ambient temperature, is also produced and by combining the second, third and fourth signals there is produced an output signal which is proportional to the temperature of the junction of the semiconductor.

In the preferred circuit embodiment of the invention, the first signal is produced by sensing the device current and producing a voltage signal proportional thereto. This voltage signal is applied to an analogue circuit having a nonlinear gain which is a function of the magnitude of the voltage signal. The output of this analogue circuit is the first signal discussed above. The first signal is then fed to two additional and similar analogue circuits which, in turn, produce the second and third signals. Suitable means is provided to develop the signal proportional to the ambient temperature which latter signal is then combined in a summing circuit with the second and third signals to provide the output signal proportional to the temperature of the junction of the semiconductor device.

BRIEF DESCRIPTION OF THE DRAWING

While the present invention is particularly defined in the claims annexed to and forming a part of this specification, a better understanding may be had from the following description taken in conjunction with the accompanying drawing, in which:

DETAILED DESCRIPTION

Figure 1:
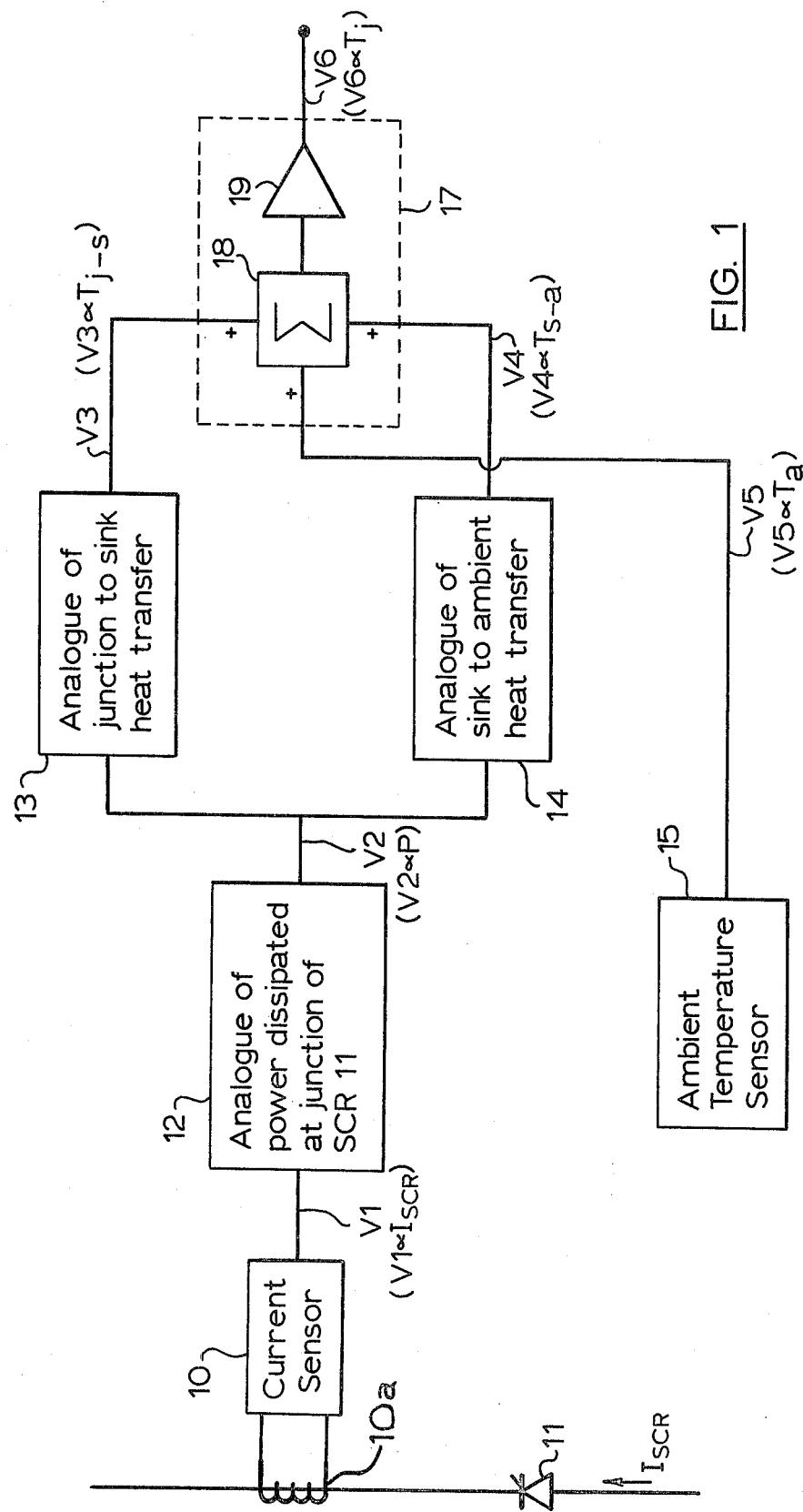
FIG. 1 is a simplified block diagram of the invention.
Figure 3:
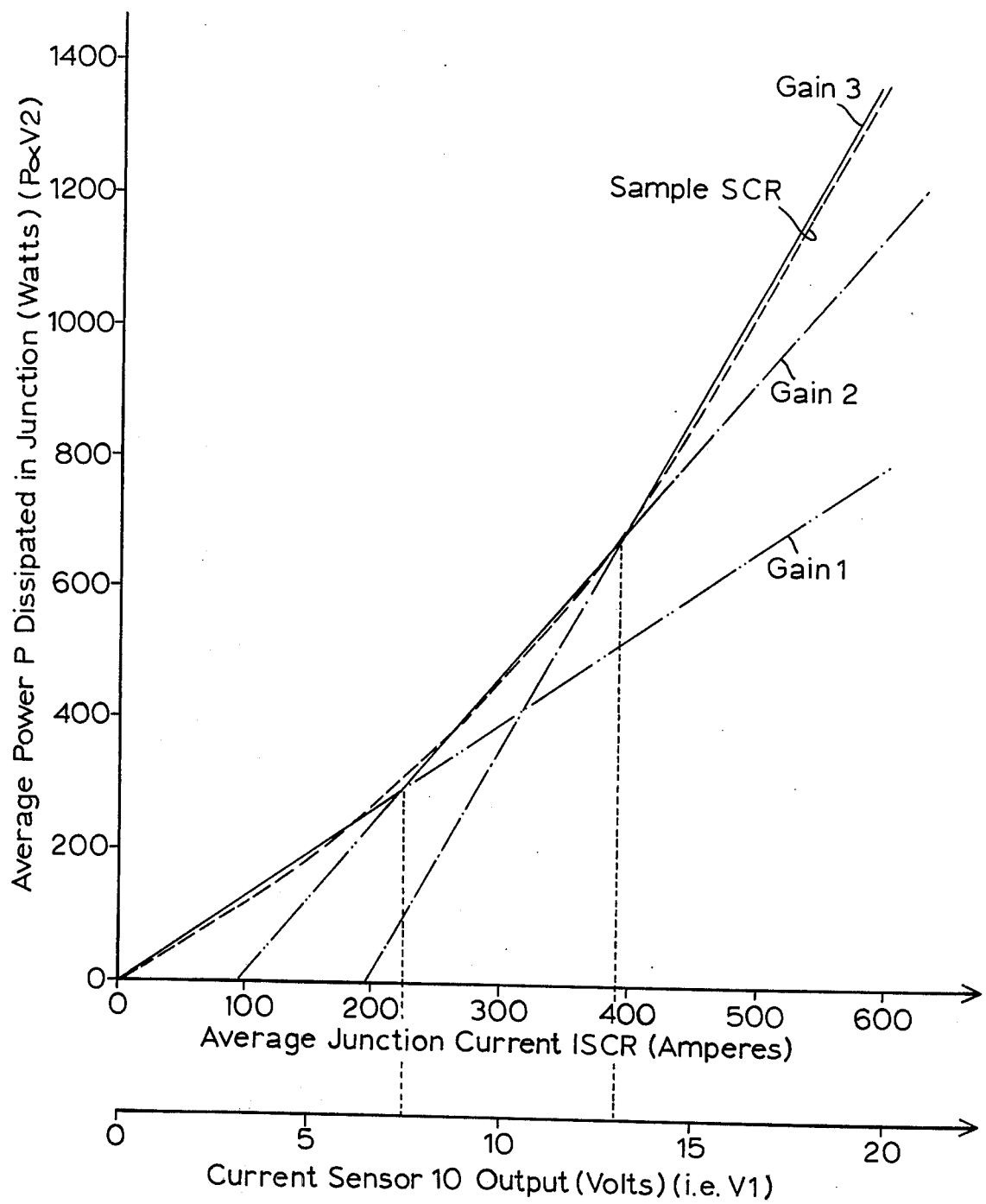

FIG. 1 is a simplified block diagram of the circuit of the present invention depicting the major components and their interconnections in a typical application. A current sensor 10, which includes suitable means such as a current transformer 10a, monitors the average current $I_{SCR}$ flowing through a semiconductor device, shown as an SCR 11, the junction temperature of which is to be monitored. The output of current sensor 10 is shown as a negative d.c. voltage V1, the magnitude of which is proportional to the average current $I_{SCR}$ flowing through SCR 11. Voltage V1 is fed to an analogue circuit 12 which produces an output voltage V2, the magnitude of which is approximately proportional to the power (P) dissipated at the junction of SCR 11. Analogue circuit 12 is a circuit that relates the average junction current $I_{SCR}$ to the average power P dissipated at the junction of SCR 11. This relationship is shown in FIG. 3.

In FIG. 1, the output voltage V2 from analogue circuit 12 is fed to two additional analogue circuits. Analogue circuit 13 accounts for the heat transfer between the junction of SCR 11 and a heat sink (not shown) and produces an output voltage V3, the magnitude of which is approximately proportional to the temperature difference (Tj-s) between the junction and the heat sink. As indicated, the heat sink has not been shown in the figure, but heat sinks are well known, and in normal use they are physically connected to a semiconductor device, such as SCR 11, to aid in heat dissipation to the ambient. While in most high power applications of semiconductor devices heat sinks are used, in some applications separate sinks are not employed, and the normal case or covering of the semiconductor device will be used as a "heat sink". Accordingly, the term heat sink will be used throughout this specification, and the claims, to refer to either a separate heat sink physically connected to the semiconductor device or to the normal case of the semiconductor device.

The output voltage V2 from analogue circuit 12 is also applied to an analogue circuit 14 which accounts for the heat transfer between the heat sink and the ambient and produces an output voltage V4, the magnitude of which is approximately proportional to the temperature difference (Ts–a) between the heat sink and the ambient.

An ambient temperature sensor 15 is employed to account for the ambient temperature (Ta). The output of ambient temperature sensor 15 is an output voltage V5, the magnitude of which is approximately proportional to the ambient temperature (Ta).

Output voltages V3, V4 and V5 from circuits 13, 14 and sensor 15 respectively, are then fed to a summing circuit 17. Summing circuit 17 includes a summer 18 and an inverter 19. The output of summing circuit 17 is an output voltage V6, the magnitude of which is approximately proportional to the temperature Tj of the junction of SCR 11.

Figure 2:
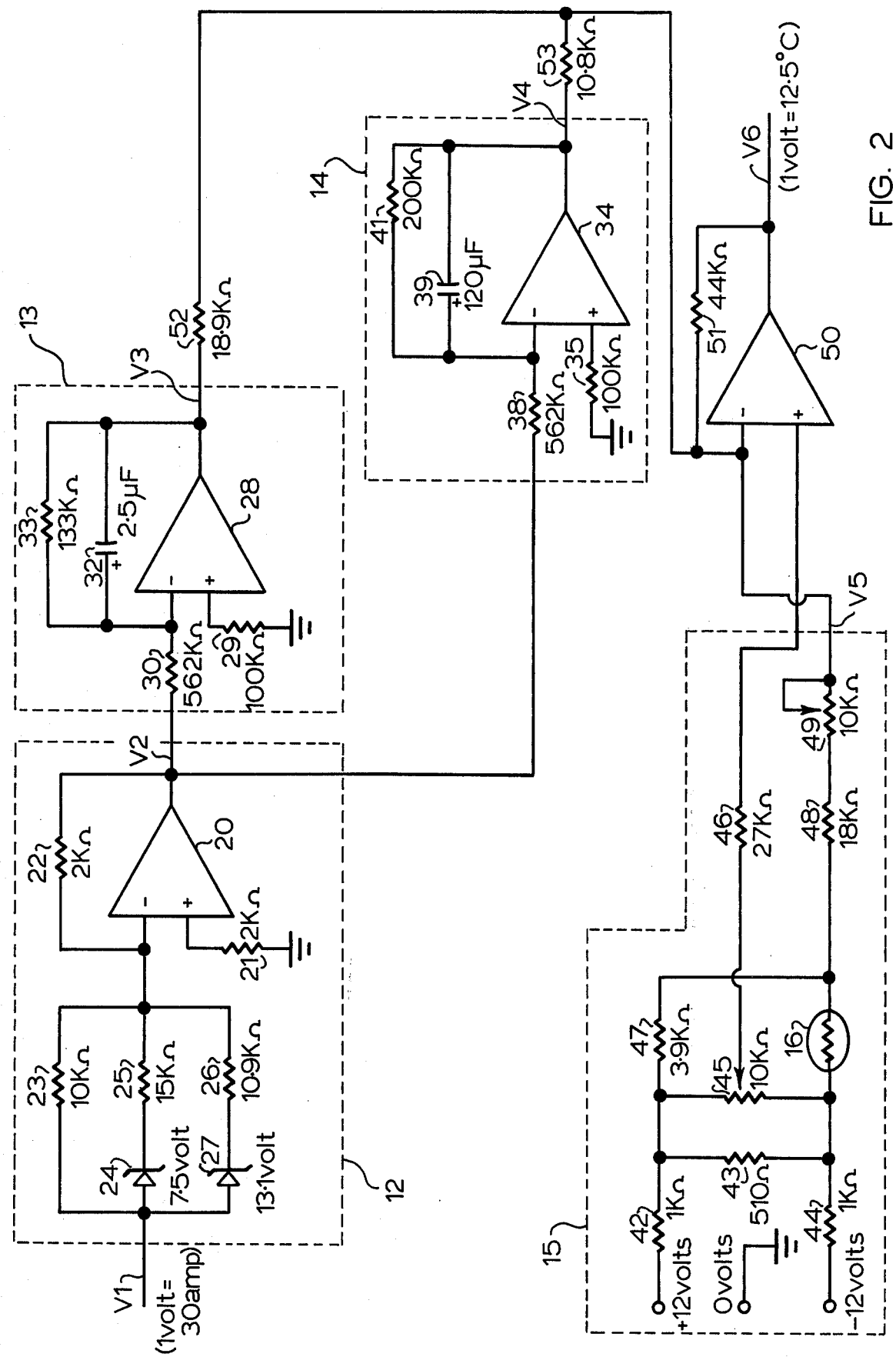
FIG. 2 is a schematic diagram of the preferred embodiment of the circuit of the present invention; and, FIG. 3 is a graph showing the current versus power relationship for a typical semiconductor device.

FIG. 2 is a simplified schematic of the block diagram of FIG. 1. The SCR 11 and current sensor 10 have been omitted from FIG. 2 in order to simplify the description. As shown in FIG. 2, the output voltage V1 from current sensor 10 (FIG. 1) is applied to the input of analogue circuit 12. Analogue circuit 12 comprises an operational amplifier 20 with its normal input (+) connected to ground potential via a resistor 21. The output of operational amplifier 20 is connected back to its inverting input (−) via a resistor 22. Output voltage V1 is fed to the inverting input (−) of amplifier 20 via the parallel circuit combination of: a resistor 23; a series circuit including a zener diode 24 and a resistor 25; and a series circuit including a zener diode 27 and a resistor 26. In essence, analogue circuit 12 acts as an amplifier with a voltage gain that varies depending upon the voltage (i.e., V1) applied to its input. As mentioned previously, voltage V1 is negative and, for illustrative purposes, will vary from zero volts to approximately −15 volts. (This voltage value, like all component and voltage values given in this specification, are for illustrative purposes only and are not to be construed in any way as a limitation on the invention.) The gain of analogue circuit 12 is given by the negative of the ratio of the value of the feedback impedance (i.e., resistor 22) to the value of the input impedance. The value of the feedback impedance remains constant since it is simply a resistor. The effective value of the input impedance changes, however, depending upon the value of voltage V1, and the voltage gain of analogue circuit 12 changes accordingly. When voltage V1 is such that $0 \geq V1 > -7.3$ volts, zener diodes 24 and 27 are reversed biased and therefore, nonconducting. Consequently, the only input resistor actively functioning in the circuit is resistor 23. At this time, the gain of circuit 12 is given by the negative of the ratio of the value of resistor 22 to the value of resistor 23; as illustrated, $-2K\Omega/10K\Omega$ or $-0.2$. Once the value of voltage V1 becomes such that $-7.5$ volts $\geq V1 > -13.1$ volts, zener diode 24 becomes forwarded biased, and conducting. (Diode 27 remains reversed biased.) When zener diode 24 becomes conductive, the input impedance to operational amplifier 20 is reduced because resistors 23 and 25 are now in a parallel circuit configuration. Because the input impedance is reduced, the magnitude of the gain of circuit 12 is increased. Similarly, when $V1 \leq -13.1$ volts, diode 27 is forward biased, and all three input resistors 23, 25 and 26 are in parallel further reducing the input impedance and hence further increasing the gain of amplifier 20.

The function of analogue circuit 12 is to produce an output voltage V2 which is proportional to the average power P dissipated at the junction of SCR 11. The specifications of semiconductor devices give a relationship between current flowing through a junction and the power dissipated in that junction. An example of such data is given by that curve in FIG. 3 marked "Sample SCR". This sample SCR curve is approximated by the analogue circuit 12. As can be seen from FIG. 3, the approximation by circuit 12 consists of segments of three straight lines; the straight lines involved are labelled "Gain 1", "Gain 2" and "Gain 3". These three lines, relate of course, to the three different gains exhibited by circuit 12 depending upon which zener diodes (24, 27) are conducting. When zener diodes 24 and 27 are both reverse biased, and therefore nonconducting, the relation of current $I_{SCR}$ to power P, as approximated by circuit 12, is given by the line marked Gain 1. When zener diode 24 is conducting but zener diode 27 is still reversed biased, and therefore nonconducting, the relation between current $I_{SCR}$ and power P, as approximated by circuit 12, is given by the line marked Gain 2. Similarly, when both zener diodes 24 and 27 are forward biased and conducting, the approximation, by circuit 12, of the relation between current $I_{SCR}$ and power P is given by the line marked Gain 3. It should be remembered that voltage V1 is proportional to the current $I_{SCR}$ and that, therefore, output voltage V2 is proportional to the power P.

Returning to FIG. 2, output voltage V2 is applied to both analogue circuits 13 and 14. Analogue circuit 13 comprises an operational amplifier 28, a resistor 29 connecting the normal input (+) of amplifier 28 to ground potential, a resistor 30 connecting input voltage V2 to the inverting input (−) of amplifier 28, and a feedback path including the parallel combination of a resistor 33 and a capacitor 32 connecting the output of amplifier 28 to its inverting input. The output of analogue circuit 13 is output voltage V3 which is approximately proportional to the temperature difference Tj-s between the junction and the heat sink.

Analogue circuit 13 amplifies voltage signal V2 by a factor given generally by the formula:

$$A [1 - e^{-(t/RC)}]$$

wherein:

A is the steady state gain of the circuit;

t is the amount of time elapsed since any change in the input voltage to the circuit; and, RC is the product of the value of the feedback resistor and the value of the feedback capacitor of said circuit.

The steady state gain of circuit 13 (i.e., term A) is given by the negative of the ratio of the value feedback resistor 33 to the value of the input resistor 30. Thus the steady state gain (and term A) is, in the illustrated embodiment, $$-\frac{133K\Omega}{562K\Omega}$$

which is −(0.24). The term RC is the value of feedback resistor 33 multiplied by the value of feedback capacitor 32. This is, of course, 133K Ω × 2.5 μF which equals (0.33). Consequently, output voltage V3 is given by the relationship:

$$V3 \approx V2\,(-0.24)\,[1-e^{-(t/0.33)}]$$

Analogue circuit 14 functions in a similar manner, but it is designed to compensate for the temperature difference (Ts–a) between the heat sink and the ambient. Analogue circuit 14 comprises an operational amplifier 34, a resistor 35 connecting the normal input (+) of operational amplifier 34 to ground potential, an input resistor 38 to connect the output voltage V2 from analogue circuit 12 to the inverting input (−) of amplifier 34, and a feedback path including the parallel combination of a capacitor 39 and a resistor 41 connecting the output of amplifier 34 to its inverting input. The output of analogue circuit 14 is the output voltage V4 which is approximately proportional to the temperature difference (Ts–a) between the heat sink and the ambient. Analogue circuit 14 amplifies voltage signal V2 by a factor of the same form as network 13. For network 14, however, in the illustrated embodiment A = −(0.36) and RC = (24.0). Consequently, output voltage V4 is given by the relationship:

$$V4 \approx V2\,(-0.36)\,[1-e^{-(t/24)}]$$

Ambient temperature sensor 15 is employed to provide an indication of the ambient temperature Ta. In the illustrated embodiment sensor 15 comprises resistors 42, 43 and 44 connected in series between a +12 volt supply and a −12 volt supply as shown in FIG. 2. A potentiometer 45 has its fixed ends connected in parallel with resistor 43 and its moveable contact is connected to one end of a resistor 46. A series circuit including a resistor 47 and a thermistor 16 is connected in parallel to the fixed ends of potentiometer 45. The junction of resistor 47 and thermistor 16 is connected to a resistor 48 which is in turn connected to a rheostat 49. The output of ambient temperature sensor 15 is output voltage V5 which is approximately proportional to the ambient temperature Ta.

Summing circuit 17 is used to sum the voltages, V3, V4 and V5 which are approximately proportional to the temperature differences Tj–s, Ts–a and the temperature Ta, respectively. Summing circuit 17 comprises an operational amplifier 50, a resistor 51 connected between its output and inverting input (−), and a pair of input resistors 52 and 53, both connected to the inverting input (−) amplifier 50. Output voltage V3 is fed via resistor 52 to operational amplifier 50 and output voltage V4 is fed to operational amplifier 50 via resistor 53. The output from resistor 46 of ambient temperature sensor 15 is fed to the normal input (+) of amplifier 50 and the output from rheostat 49 is fed to the inverting input (−) of amplifier 50. The output of summing circuit 17 is output voltage V6 which is approximately proportional to the temperature of the junction Tj.

The operation of the circuit of FIG. 2 is that which was explained with respect to FIG. 1. The voltage V1 from the current sensor is applied to the analogue circuit 12 which outputs a signal V2 proportional to the power dissipated in the semiconductor junction. This is achieved, as previously explained, through the nonlinear gain characteristics of the curcuit 12 — the gain being a function of the magnitude of the voltage signal V1.

The output of circuit 12, voltage signal V2, is applied to each of the analogue circuits 13 and 14 which respectively account for the temperature differences between the junction and the heat sink and the heat sink and ambient. The outputs from the two analogue circuits 13 and 14 are then combined in an additional analogue circuit with the separately generated signal from the temperature sensor circuit 15 representing ambient temperature to give the junction temperature. That is, by adding to the ambient temperature indication, indications of the temperature differences between the ambient and the heat sink and the heat sink and the junction, there is developed an indication of the temperature of the semiconductor junction. This indication, that is, the output from the amplifier 50 in FIG. 2, may be used as desired. It may, for example, be used to trigger an alarm or shut down the semiconductor circuit when it exceeds a predetermined value. It may also be used, inasmuch as it is in the embodiment shown an analogue signal, to provide a continuous indication of the junction temperature.

While there has been shown and described what is at present considered to be the preferred circuit embodiment and method of the present invention, modifications thereto will readily occur to those skilled in the art. It is not desired, therefore, that the invention be limited to that specifically shown and described and it is intended to cover in the appended claims all such modifications as fall within the true spirit and scope of the invention.

What is claimed is:

1. A circuit for monitoring the temperature of a junction of a semiconductor device comprising:
   a. means to produce a first signal proportional to the power dissipated at the junction of the semiconductor device;
   b. first means responsive to said first signal to produce a second signal proportional to the difference between the junction temperature and the temperature of a heat sink associated with said device;
   c. second means responsive to said first signal to produce a third signal proportional to the difference between the heat sink temperature and ambient temperature;
   d. means to produce a fourth signal proportional to the ambient temperature; and,
   e. combining means to combine said second, third and fourth signals to provide an output signal proportional to said junction temperature.

2. The invention in accordance with claim 1 wherein said first recited means includes means to sense the current through the semiconductor junction.

3. The invention in accordance with claim 1 wherein said first recited means includes means to develop a voltage signal proportional to the current through the junction and variable gain amplifier means, the gain of which is dependent upon the magnitude of said voltage signal, responsive to said voltage signal to produce said first signal.

4. The invention in accordance with claim 3 wherein said variable gain amplifier includes an operational amplifier having a feedback resistor and a plurality of input paths which are individually rendered conductive at different values of the voltage signal.

5. The invention in accordance with claim 1 wherein said first and said second means each comprises an analogue circuit for receiving said first signal as an input, said circuit comprising an operational amplifier having a feedback path including the parallel combination of a resistor and a capacitor connected between the output and input of said operational amplifier and wherein each of the analogue circuits functions to amplify its input by a factor given by the formula:

$$A\,[1-e^{-t/(RC)}]$$

in which:
 $A$ = the steady state gain of the analogue circuit;
 $R$ = the value, in ohms, of the resistor in the feedback path;
 $C$ = the value, in farads, of the capacitor in the feedback path; and,
 $t$ = the elapsed time, in seconds, since a previous change in the value of said first signal.

6. A circuit for monitoring the temperature of a junction of a semiconductor device comprising:
 a. means to sense a current through the semiconductor junction and to produce a voltage signal having a value proportional to the magnitude of said current;
 b. means responsive to said voltage signal to produce a first signal proportional to the power dissipated at the junction of the semiconductor device;
 c. first means responsive to said first signal to produce a second signal proportional to the difference in temperature between the junction and a heat sink associated with said device;
 d. second means responsive to said first signal to produce a third signal proportional to the difference between the heat sink temperature and ambient temperature;
 e. means to produce a fourth signal proportional to the ambient temperature; and,
 f. means to combine said second, third and fourth signals to derive an output signal proportional to said junction temperature.

7. The invention in accordance with claim 6 wherein the means responsive to said voltage signal includes variable gain amplifier means, the gain of which is dependent upon the magnitude of said voltage signal, responsive to said voltage signal to produce said first signal.

8. The invention in accordance with claim 7 wherein said variable gain amplifier includes an operational amplifier having a feedback resistor and a plurality of input paths which are individually rendered conductive at different values of the voltage signal.

9. The invention in accordance with claim 6 wherein the means to produce each of the recited signals is an analogue circuit means and each signal respectively produced thereby is an analogue signal.

10. The invention in accordance with claim 6 wherein said first and said second means each comprises an analogue circuit for receiving said first signal as an input, said circuit comprising an operational amplifier having a feedback path including the parallel combination of a resistor and a capacitor connected between the output and input of said operational amplifier and wherein each of the analogue circuits functions to amplify its input by a factor given by the formula:

$$A\,[1-e^{-t/(RC)}]$$

in which:
 $A$ = the steady state gain of the analogue circuit;
 $R$ = the value, in ohms, of the resistor in the feedback path;
 $C$ = the value, in farads, of the capacitor in the feedback path; and,
 $t$ = the elapsed time, in seconds, since a previous change in the value of said first signal.

11. A method for monitoring the junction temperature of a semiconductor device comprising the steps:
 a. producing a first signal proportional to the power dissipated at the junction of the semiconductor device;
 b. producing a second signal, in response to said first signal, proportional to the difference in temperature between the junction and a heat sink associated with the semiconductor device;
 c. producing a third signal, in response to said first signal, proportional to the difference between the heat sink temperature and ambient temperature;
 d. producing a fourth signal proportional to the ambient temperature; and,
 e. combining said second, third and fourth signals to produce a fifth signal proportional to the temperature of said junction.

12. The method in accordance with claim 11 wherein each of the signals produced is an analogue signal the magnitude of which is indicative of the value of that represented.

13. The method in accordance with claim 11 in which the step of producing the first signal includes the steps:
 a. sensing the current through the semiconductor junction;
 b. producing an additional signal proportional to the sensed current; and,
 c. producing said first signal as a function of said additional signal.

14. The method in accordance with claim 11 in which the step of producing the first signal includes the steps:
 a. sensing the magnitude of the current through the semiconductor junction;
 b. producing a voltage signal proportional to the magnitude of the sensed signal; and,
 c. producing said first signal as a nonlinear function of the value of said voltage signal.

* * * * *